UNITED STATES PATENT OFFICE.

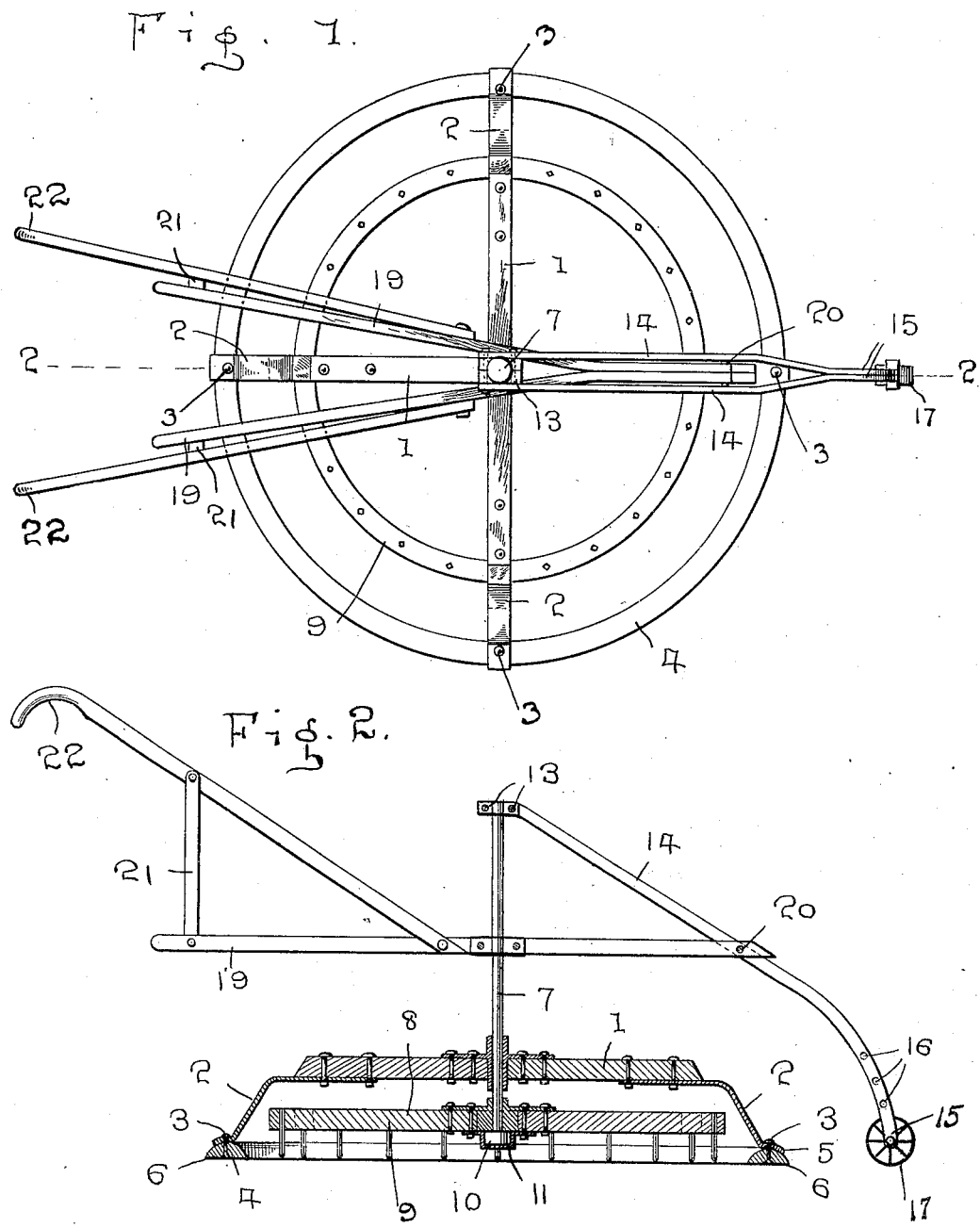

JOHN O. RICHMOND, OF SPRINGFIELD, OREGON.

COMBINED HARROW AND WEEDER.

938,398.  Specification of Letters Patent.  Patented Oct. 26, 1909.

Application filed August 4, 1908. Serial No. 446,905.

*To all whom it may concern:*

Be it known that I, JOHN O. RICHMOND, a citizen of the United States, residing at Springfield, in the county of Lane and State of Oregon, have invented certain new and useful Improvements in Combined Harrows and Weeders; and I do hereby declare the following to be a full, clear, and exact description of the invention, such as will enable others skilled in the art to which it appertains to make and use the same.

This invention relates to new and useful improvements in combined harrows and weeders and it is an object of the invention to provide a device of this character which is of the drag type and so assembled as to permit a rotary movement of the weeder and the harrow, the rotary movement of the weeder and the harrow being independent one of the other.

It is also an object of the invention to provide a novel device of this character wherein the weeder is so constructed as to draw the weeds from the ground or soil in lieu of the well known idea of cutting the weeds.

It is also an object of the invention to provide a novel device of this character which will be simple in construction, efficient and advantageous in practice and comparatively inexpensive to manufacture.

With the above and other objects in view, the invention consists of the details of construction and in the novel arrangement and combination of parts to be hereinafter more particularly referred to.

In describing the invention in detail reference will be had to the accompanying drawings forming parts of this specification wherein like characters of reference denote corresponding parts in the several views, and in which, Figure 1 is a top plan view of the invention, and, Fig. 2 is a sectional view taken on the line 2—2 of Fig. 1.

In the drawings 1, 1, denote two cross beams, arranged at right angles one to the other and having secured to their under surface at the outer end portions the depending knees, 2, which are secured by suitable fastenings, 3, to a ring 4. This ring 4 has its outer upper portion inclined to form cutting edges 6, said inclination making the ring approximately semi-oval in cross sections. It has been found that these cutting edges are most essential as when the ring 4 is moved it will plow its way in the soil or ground and work under the surface thereof to a depth of two or three inches and thus remove the weeds from the ground, and not cut the weeds at the ground, an advantage, which is thought to be obvious.

Passing through the beams 1 at their intersection there is a rod 7, which also passes through the frame 8 of a circular harrow 9. This rod is provided at its lower end with a head 10, which is confined within a housing 11, secured to an under surface of the frame 8. The harrow is adapted to rotate around the rod 7 and the head 10 is employed to retain the harrow, or its frame 8 on the rod and to permit an elevation of the harrow when desired. The rod 7 projects a desired distance above the beams 1 and has secured to the upper end thereof through the medium of the bolts 13, the downwardly and outwardly inclined parallel rods 14 which have their lower end portions 15 contacting and provided with a plurality of openings 16 for the proper engagement of suitable draft rigging, not shown.

In order that the harrow 9 may be elevated, the rod 7 intermediate its length has clamped thereto, the two parallel bars 19, the outer ends of said handles being pivotally secured by the pin 20 between the rods 14. To the outer end portions of the parallel bars 19 are secured the operating handles 22, which are suitably held in position by their braces 21.

In order to enhance the operation of the device there is mounted between the lower ends of the rods 14 beneath the openings 16 the wheel 17.

In order to elevate the harrow out of use, it is only necessary to suitably manipulate the handles 22 so as to poise or pivot the machine upon the wheel 17, when it is apparent the harrow may be moved about the field from place to place as required, and when brought to rest as for effective use, the hand pressure is simply removed from the handles when the harrow teeth will be lowered into contact with the ground.

I claim:

A device of the character described, comprising crossing beam members and an upright central rod member passing through said crossing beam members and having its lower end supported in position, an annular member substantially oval in cross section with its lower edges adapted to cut into the surface and depending knees between said crossing beam members and said annular cutting member.

In testimony whereof I have signed my name to this specification in the presence of two subscribing witnesses.

JOHN O. RICHMOND.

Witnesses:
    JOSEPH J. BRYAN,
    MAUDE T. BRYAN.